Nov. 5, 1935.  W. L. G. POLLARD  2,020,123
VARIABLE SPEED TRANSMISSION
Filed Sept. 30, 1933  3 Sheets-Sheet 2
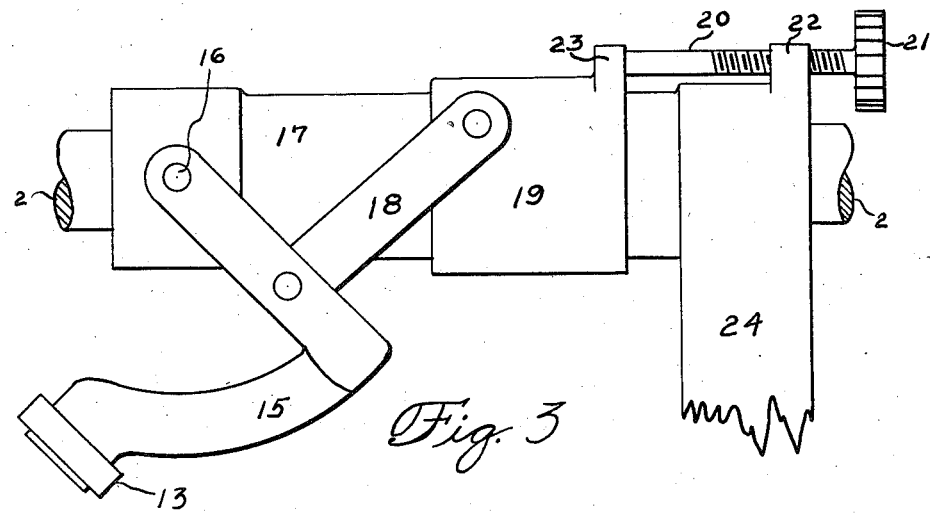
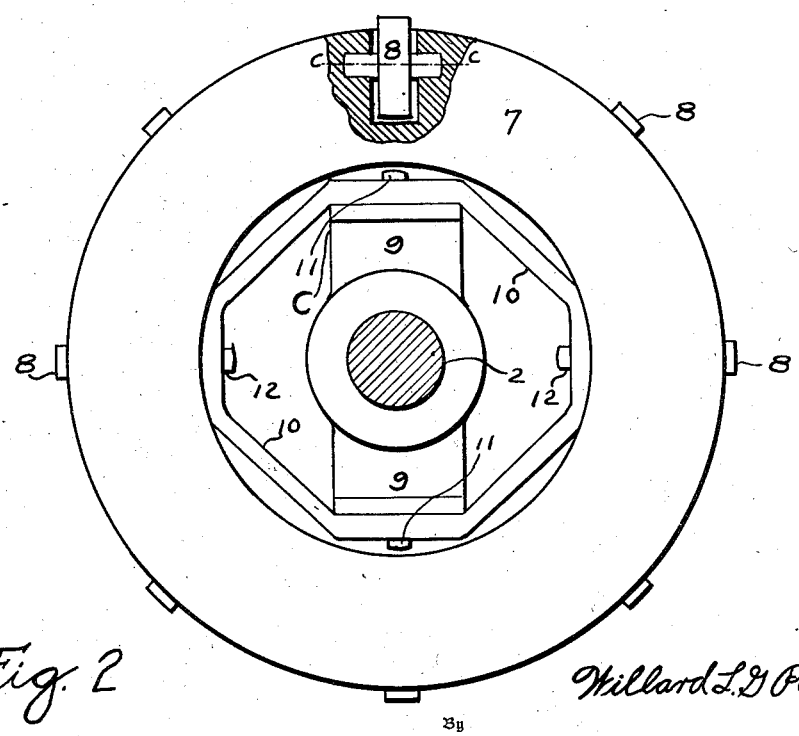

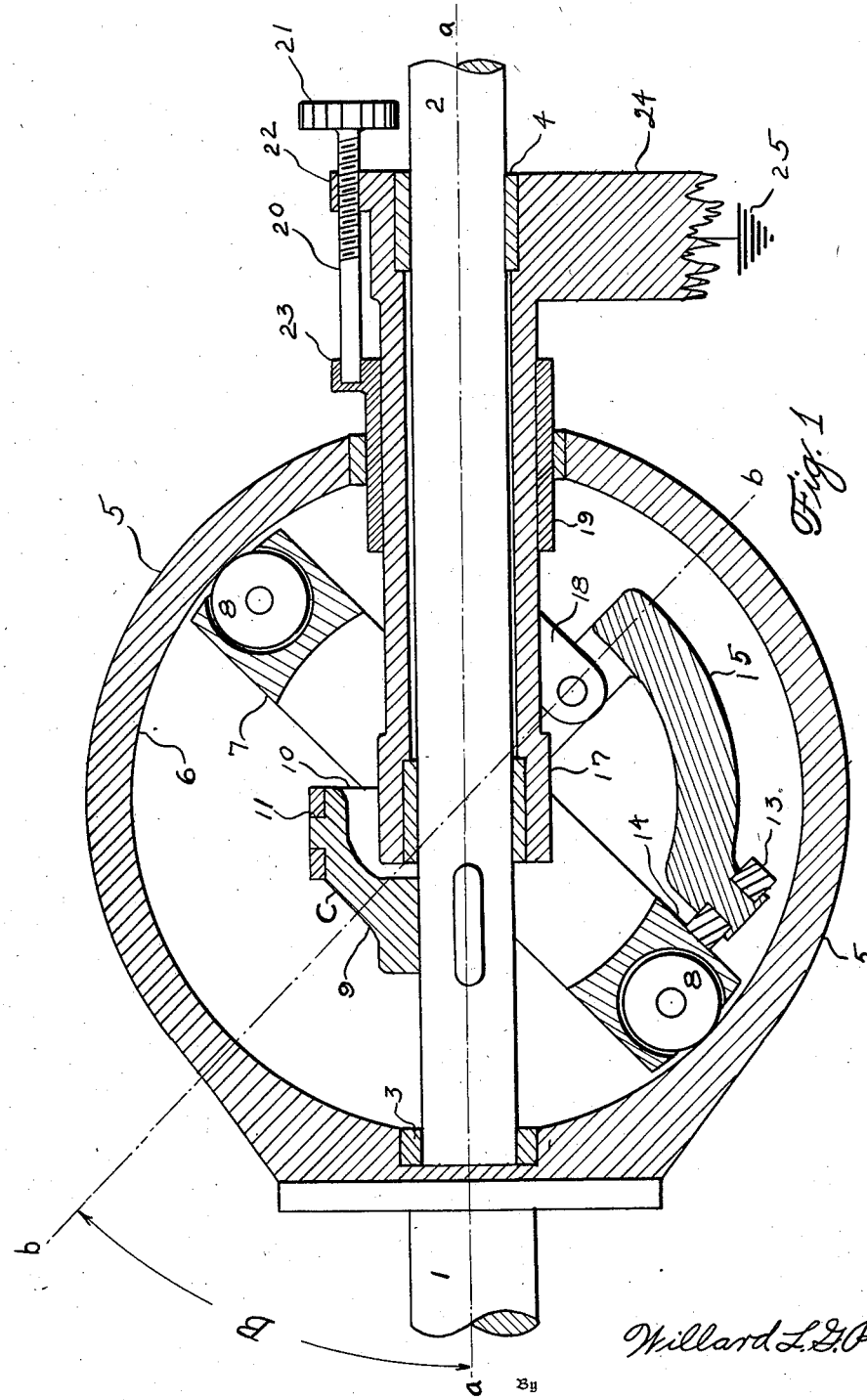

Nov. 5, 1935.  W. L. G. POLLARD  2,020,123

VARIABLE SPEED TRANSMISSION

Filed Sept. 30, 1933  3 Sheets-Sheet 3

Inventor
Willard L. G. Pollard

By
Jones, Addington, Ames & Seibold
Attorneys

Patented Nov. 5, 1935

2,020,123

UNITED STATES PATENT OFFICE 2,020,123

VARIABLE SPEED TRANSMISSION

Willard L. G. Pollard, Washington, D. C., assignor to Theresa Pollard, Evanston, Ill.

Application September 30, 1933, Serial No. 691,702

8 Claims. (Cl. 74—63)

My invention relates to variable speed transmissions of the type wherein a hollow spherical surface engages rollers carried by a spider, the rollers having their axes at right angles to the axis of the spider.

An object of my invention is to provide such a transmission capable of providing a unity speed ratio.

Another object is to provide such a transmission in which direct drive is automatically established when unity speed ratio is attained.

Other objects will appear from the appended specification and claims.

In the drawings:

Figure 1 is a vertical front-to-rear section of one embodiment of my invention;

Fig. 2 shows the roller-carrying spider and associated elements; parts 9 and 10 are omitted from the lower half.

Fig. 3 shows the construction used to set the axis of the roller carrying spider;

Figure 5:
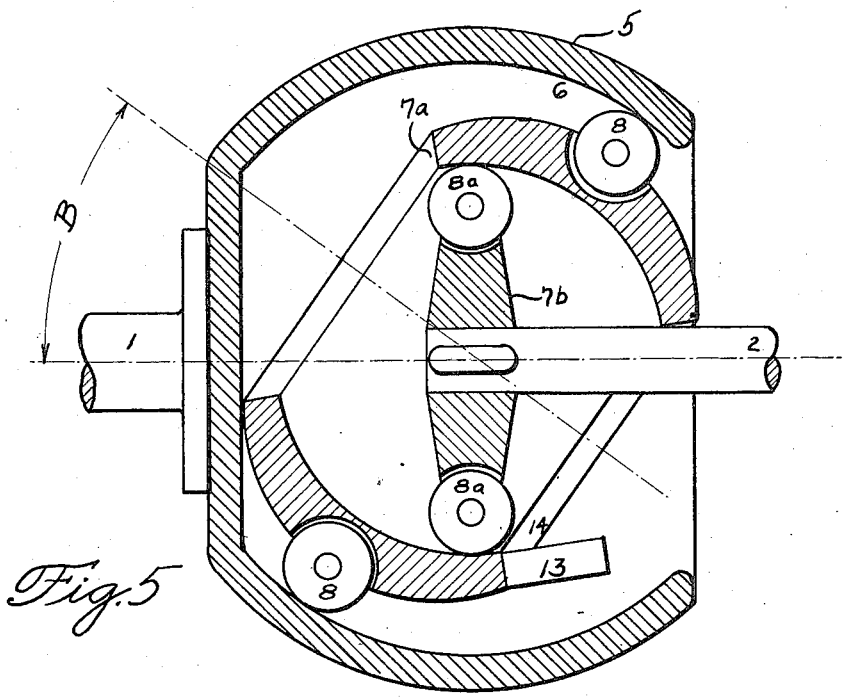
Fig. 5 shows another embodiment of my invention.

Referring to the drawings in detail, and first to Fig. 1, the construction shown therein is a variable speed transmission comprising a driving shaft 1, assumed to be an engine shaft and hence confined to a fixed axis $a$—$a$, a driven shaft 2 rotatable in the bearings 3 and 4, and means for the transmission of power from the driving shaft 1 to the driven shaft 2. These means comprise a driving member 5, rotatable with the driving shaft 1 and having a spherical inside surface 6, a driven spider 7 (better shown in Fig. 2), rotating steadily about its stationary axis $b$—$b$ which may be fixed at various angles to the axis $a$—$a$ of the driving shaft 1, and carrying about its periphery a plurality of rollers 8 whose axes $c$—$c$ are perpendicular to the axis $b$—$b$ of the spider 7, said rollers 8 bearing against, and frictionally engaging, the spherical surface 6 of the driving member 5 and a universal joint construction C for communicating the motion of the spider 7 to the driven shaft 2. This universal joint construction C is preferably of the constant angular velocity type, but for simplicity is shown as a pair of arms 9 extending from the driven shaft 2, and an intermediate gimbal member 10 pivoted at 11 to the arms 9 and at 12 to the driven spider 7.

The method of setting the axis $b$—$b$ about which the spider 7 must revolve will now be described. These means consist of a roller 13 (Figs. 1 and 3) which bears against the side 14 of the spider 7 and forces the spider 7 to rotate about an axis $b$—$b$ at an angle B to the axis $a$—$a$ of the driving shaft 1. The roller 13 is carried on an arm 15 pivoted at 16 to the torque tube 17 which encircles the driven shaft 2. A link 18 connects the arm 15 to a second tube 19 outside and slidable on the first torque tube 17. A screw 20, turned by the knob 21, threaded in the lug 22 on the first torque tube 17 and bearing in the lug 23 on the tube 19, sets the position of the tube 19 on the first torque tube 17. The position of the tube 19 obviously determines the position of the arm 15, the two being connected together by the link 18.

In action, the driving member 5 rotates about its axis and drives the driven spider 7, through the rollers 8, at a speed less than the speed of the driving member 5. It is to be remembered that the driven spider 7 rotates steadily about its axis $b$—$b$, which is stationary. The speed ratio between the driving member 5 and the driven spider 7 depends (as will presently be shown) upon the angle B between the axes $a$—$a$ and $b$—$b$ of the driving member 5 and the spider 7, and hence is variable by setting of the screw 20. The motion of the spider 7 is communicated to the driven shaft 2 by the universal joint construction C. The reaction of the universal joint is taken up by the roller 13 and transmitted through the arm 15, pivot 16, torque tube 17, and support 24 to the earth or framework 25.

Figure 4:
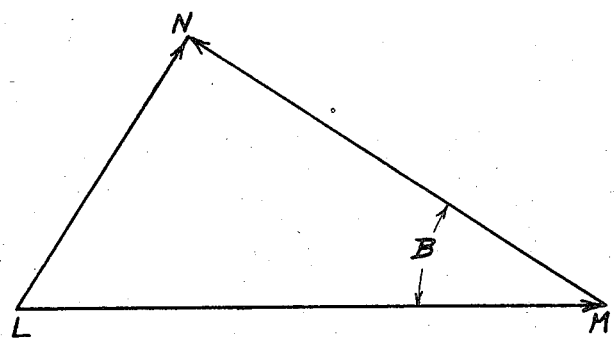
Fig. 4 is a vector diagram of the angular velocities of the elements of the transmission.

Referring next to the vector diagram (Fig. 4) to show the action of the machine. Assume that:

LM represents the angular velocity of the driving member 5

B is the angle between the axes $a$—$a$ and $b$—$b$ of the driving member 5 and the driven spider 7 and;

The velocity of the spider equals $LM \cos B$

Subtract vectorially the velocity of the spider 7 from the angular velocity of the driving sphere 5, drawing it as MN; the difference, LN, is the angular velocity of the spider 7 with respect to the driving member 5; and by trigonometry LN is perpendicular to MN and therefore to the axis $b$—$b$ of the spider 7.

This means that the motion of the spider 7 with respect to the driving member 5 is always one of rotation about an axis perpendicular to the axis $b$—$b$ of the spider 7. This is the only motion allowed by the engagement of the rollers 8 with the surface 6, and hence the original assumption that the velocity of the spider 7 equals the velocity of the driving member times cos B, must be true.

It is to be noted that when B approaches 90 degrees, the speed ratio of the transmission approaches unity, and the transmission becomes a simple clutch providing direct drive.

Referring last to Fig. 5. The construction shown is a transmission comprising a driving shaft 1 and a driven shaft 2 both supported in suitable bearings not shown, and means for the transmission of power from the driving shaft to the driven shaft. This means comprises a hollow spherical driving member 5 rotatable with the driving shaft; a plurality of rollers 8 frictionally engaging the spherical inside surface 6 of the driving member; an intermediate spider-sphere member 7ª carrying the rollers 8 on its spider portion 7 so that their axes c—c are perpendicular to the axis b—b of the said intermediate member 7ª; a roller 13 forcing the intermediate member 7ª to rotate about a stationary axis b—b at an angle B to the axis a—a of the driving member 5; rollers 8ª bearing on the inner spherical surface 6ª of the intermediate member 7ª, and a spider 7ᵇ, carried by the driven shaft 2, which spider 7ᵇ carries the second plurality of rollers 8ª so that their axes c'—c' are at right angles to the axis of the spider 7ᵇ. In action, the driving member 5 drives the intermediate member 7ª at a speed less than the speed of the driving member 5; the intermediate member 7ª drives the spider 7ᵇ at a less speed than that of the intermediate member 7ª.

There are conceivable many pairs of elements which could take the place of my sphere and roller spider: sphere and spider with unidirectional friction pawls; a magnetic drag on an anisotropic armature, etc. I wish it understood, therefore, that when I refer to "sphere and spider", I mean any pair of reacting bodies, the reaction between which must be a torque about an axis lying nearer the axis of one than of the other.

Further modifications will be apparent to those skilled in the art and it is desired, therefore, that the invention be limited only by the prior art and the scope of the appended claims.

Having thus described my invention, what I claim and desire to secure by Letters Patent is:

1. A driving sphere rotatable about a fixed axis, a driven spider, rollers journalled on said driven spider with axes perpendicular to the axis of said spider, said rollers frictionally engaging the driving sphere and said driven spider being rotatable about a fixable axis at an angle to the axis of the driving sphere.

2. A driving sphere rotatable about a fixed axis, a driven spider, rollers journalled on said driven spider with axes perpendicular to the axis of said spider, said rollers frictionally engaging the driving sphere and said driven spider being rotatable about a flexible axis at an angle to the axis of the driving sphere, and universal joint means for taking the power from the driven spider in a different direction than the axis of said driven spider.

3. A driving sphere rotatable about a fixed axis, a driven spider, rollers journalled on said driven spider with axes perpendicular to the axis of said spider, said rollers frictionally engaging the driving sphere and said driven spider being rotatable about a fixable axis at an angle to the axis of the driving sphere, and means for varying the angle between the axes of driving sphere and driven spider.

4. A driving sphere rotatable about a fixed axis, a driven spider, rollers journalled on said driven spider with axes perpendicular to the axis of said spider, said rollers frictionally engaging the driving sphere and said driven spider being rotatable about a fixable axis at an angle to the axis of the driving sphere, a second spherical driving member integral and concentric with the driven spider, and a second driven spider rotatable about an axis at an angle to the axis of the first driven spider.

5. A variable speed transmission comprising a driving sphere rotating about a stationary axis, a driven spider rotating about a second stationary axis at an angle to said first stationary axis, and means for transmitting power between said driving sphere and driven spider comprising a plurality of friction members carried on the periphery of the driven members in frictional engagement with the driving sphere and each reacting on said driving sphere in a direction perpendicular to the axis of the driven spider.

6. A variable speed transmission comprising a driving shaft, a driven shaft coaxial with said driving shaft, and means for transmitting power from said driving shaft to said driven shaft comprising a driving sphere attached to said driving shaft, a driven spider rotating about a stationary axis at an angle to the axis of the driving shaft and provided with a plurality of friction members in frictional engagement with the driving sphere and each reacting on said driving sphere in a direction perpendicular to the axis of rotation of the driven spider, and a universal joint connecting the driven spider to the driven shaft.

7. A variable speed transmission according to claim 1 provided with a roller carried on an arm pivoted, for adjustment, to a fixed reaction member, said roller pressing on the periphery of the driven spider to confine it to rotation about a desired axis.

8. A variable speed transmission according to claim 1 provided with a roller carried on an arm pivoted, for adjustment, to a fixed reaction member, said roller pressing on the periphery of the driven spider to confine it to rotation about a desired axis in which the adjustment of the arm varies the speed ratio of the transmission.

WILLARD L. G. POLLARD.

CERTIFICATE OF CORRECTION.

Patent No. 2,020,123.  November 5, 1935.

WILLARD L. G. POLLARD.

It is hereby certified that error appears in the printed specification of the above numbered patent requiring correction as follows: Page 2, first column, line 61, claim 2, for "flexible" read fixable; and that the said Letters Patent should be read with this correction therein that the same may conform to the record of the case in the Patent Office.

Signed and sealed this 17th day of December, A. D. 1935.

Leslie Frazer (Seal)  Acting Commissioner of Patents.